Sept. 6, 1966

J. C. MARINACE 3,271,631

UNIAXIAL CRYSTAL SIGNAL DEVICE

Filed May 8, 1962

2 Sheets-Sheet 1

INVENTOR.
JOHN C. MARINACE

BY

Alvin J. Riddles

ATTORNEY 3,271,631

UNIAXIAL CRYSTAL SIGNAL DEVICE

John C. Marinace, Yorktown Heights, N.Y., assignor to International Business Machines Corporation, New York, N.Y., a corporation of New York Filed May 8, 1962, Ser. No. 193,125

6 Claims. (Cl. 317—234)

This invention relates to signal devices; and, in particular, to a signal device employing a monocrystalline element having an elongated filamentary shape with a curved single crystalline axis following the surfaces of the element, in combination with a signal enhancing feature, signal generation and signal sensing means associated therewith.

In recent advances in devices employing effects in the fields of physics, which include optics, mechanics and electricity, the physical properties of individual materials have been playing an increasingly important part in the device performance. As the properties of materials are more intensely studied and these properties are used in more refined devices, it is becoming increasingly important to remove all extraneous effects from the materials so that the advantageous effect of the particular physical property of the individual material is not masked and can be more effectively utilized. It is for these reasons that single crystals of materials are being employed since in the single crystal, all atoms are in an orderly arrangement, periodically repeated throughout the structure.

Some specific examples of the use of crystalline properties may be seen as follows. In semiconductor technology, crystals have been used to provide atomic periodicity of a material that may be considered to be effectively an electrical insulator. Into this material, minute quantities of electrical conductivity influencing impurities are introduced so that their effect may be utilized without being overcome by carrier traps, due to unsatisfied bonds.

Optical properties of crystals have been utilized in devices known as LASERS. These devices involve the amplification of light by stimulated emission of radiation from carefully selected impurities in a host material. In order to provide an orderly host for the impurities to be excited, a monocrystalline substance has been employed.

Single crystals of materials have been found to have unique mechanical properties, such as elasticity combined with strength.

Further, the effect of both electrical properties and optical properties of single crystalline materials have been employed, in combination, in devices. Such an effect has been described by L. V. Keldysh in Soviet Physics, JETP, vol. 34(7), No. 5, November 1958. With this effect, through the application of an electric field, a crystal has been rendered translucent or opaque to the transmission of light.

The crystals employed in the various applications thus far in the art have been, in general, cut into device bodies from a large crystal having a crystalline axis, either parallel or perpendicular to the major surfaces of the particular device body shape. As the technology develops, it is becoming apparent that the limited relationship, present thus far in the art, of the surfaces of the device body shape with respect to the crystalline axis of the material from which it is cut, will place a restriction on the uses of the physical properties of the material. Evidence of this fact may be seen optically in the fact that the index of refraction of a crystal varies with crystalline orientation; and, may be seen electrically, in many semiconductors in the fact that the distance of mean free path of a carrier in the semiconductor material changes with crystalline orientation.

What has been discovered is that a unique uniaxial monocrystalline element may be fabricated wherein the element has a single flexible or curvable crystalline axis that is parallel with the surfaces of the element and the element is equipped with features which enhance the particular physical property of the element being employed in the ultimate device. Such an element has particular advantages in applications involving electrical and optical devices and because of its unique flexible or curvable crystalline axis property, this device may have potential applications in many arts that are in the very early stages of development.

In accordance with the invention, the uniaxial crystal signal device is provided by taking an elongated filamentary monocrystalline element, known in the art as a "whisker" and providing a signal enhancement feature and signal introduction and signal sensing means therefor. Small cross-sectional area monocrystalline elements, known as "whiskers" have been known in the art for a number of years. Thus far, they have been formed in materials such as: Fe; Cu; Ag; Ni; Si; Zn; NaCl; $SiO_2$; $Al_2O_3$; $MoO_3$; C; Sn; Ge; ZnO; ZnS; LiF; $MgSO_4 \cdot 7H_2$ (hydro quinone); Cd; Pb; Co; Pt; Hg;CdS; GaAs; ZnAs; graphite; Sb; and, Bi. These whiskers have been produced in a variety of ways. The best known fabrication techniques for whiskers or monocrystalline filaments or fibers may be described as:

(a) The formation of dendrites from a supercooled melt;

(b) The growth of dendrites from a supersaturated vapor;

(c) The growth of whiskers from a vapor of a compound of a transport element and the whisker material;

(d) The formation of whiskers from a strained solid; and, (e) The reduction of cross-sectional area of a larger crystalline bar by etching.

The formation and properties of the whiskers or monocrystalline filaments have been described in the following references, citations of which are provided as an example of the state of the art.

"The High-Temperature Recovery of Deformed Copper Whiskers" by S. S. Brenner and C. R. Morelock, in Acta Metallurgica, vol. 4, No. 1, 1956, pp. 89–90.

"Deformation and Fracture of Small Silicon Crystals" by G. L. Pearson, W. T. Read, Jr., and W. L. Feldmann, in Acta Metallurgica, vol. 5, April 1957, pp. 181–191.

"Torsional Strain and the Screw Dislocation in Whisker Crystals" by R. G. Treuting, in Acta Metallurgica, vol. 5, March 1957, pp. 173–175.

"Growth of Zinc Whiskers" by R. V. Coleman and G. W. Sears, in Acta Metallurgica, vol. 5, March 1957, pp. 131–136.

"Dislocations in Whiskers" by W. W. Webb, R. D. Dragsdorf and W. D. Forgeng, in The Physical Review, vol. 108, No. 2, October 15, 1957, pp. 498–499.

"Electrodeposition Onto Metal Whiskers" by D. A. Vermilyea, in The Journal of Chemical Physics, vol. 27, No. 3, September 1957, pp. 814–815.

"Germanium Dendrite Studies, I. Studies of Twin Structures and the Seeding Mechanism" by J. W. Faust, Jr. and H. F. John, in Journal of the Electrochemical Society, vol. 108, No. 9, September 1961, pp. 855–860.

"Germanium Dendrite Studies, II. Lateral Growth Processes" by J. W. Faust, Jr. and H. F. John, in Journal of the Electrochemical Society, vol. 108, No. 9, September 1961, pp. 860–863.

"Germanium Dendrite Studies, III. Dislocations" by J. W. Faust, Jr. and H. F. John, in Journal of the Electrochemical Society, vol. 108, No. 9, September 1961, pp. 864–868.

"Orientation Habits of Metal Whiskers" by R. G.

Treuting and S. M. Arnold, in Acta Metallurgica, vol. 5, No. 10, 1957, p. 598.

"The Growth of Whiskers by the Reduction of Metal Salts" by S. S. Brenner, in Acta Metallurgica, vol 4, January 1956, pp. 62–74.

"Growth and Properties of 'Whiskers'" by S. S. Brenner, in Science, vol. 128, No. 3324, September 12, 1958, pp. 569–575.

"Preparation of Silicon Whiskers" by E. S. Greiner, J. A. Gutowski, and W. C. Ellis, in Journal of Applied Physics, vol. 32, No. 11, November 1961, pp. 2489–2490.

"Morphology and Growth Mechanism of Silicon Ribbons" by R. S. Wagner and R. G. Treuting, in Journal of Applied Physics, vol. 32, No. 11, November 1961, pp. 2490–2491.

"'Space Whiskers' Grown for New Space Materials." in Science News Letter, January 27, 1962, vol. 81, No. 4, p. 62.

Some of the mechanical and electrical properties in germanium when reduced to whisker cross-sectional area are described in the I.B.M. Journal of Research and Development, vol. 5, No. 4, October 1961, in articles by R. W. Keyes and D. Dew-Hughes, pp.256–286.

In accordance with the invention, the monocrystalline filaments or whiskers are provided with features that enhance their signal responsive properties in the particular physical medium in which they are to be used and are provided with signal introducing and responding means. In a particularly useful configuration, a structural feature, in accordance with the invention, may be imparted by forming the whisker into a uniaxial crystal toroid. This structural feature is provided by elastically deforming the whisker into a circular configuration with the ends in substantial abutting relationship. The ends are then epitaxially joined so that a toroidal curved uniaxial structure is provided. Other features having advantages in the particular signal medium to be employed may be imparted to the crystal fiber. Selected examples of such features will be described in detail in the following discussion.

It is a primary object of this invention to provide a uniaxial crystal signal device.

It is another primary object of this invention to provide a uniaxial crystal signal element.

It is another object of this invention to provide an elongated uniaxial monocrystalline element having a particular crystal axis parallel to its surface.

It is another object of this invention to provide an elongated uniaxial crystalline electrical component.

It is another object of this invention to provide an elongated uniaxial crystalline toroidal electrical component.

It is another object of this invention to provide an elongated uniaxial monocrystalline optical component.

It is another object of this invention to provide an elongated uniaxial monocrystalline toroidal optical component.

It is another object of this invention to provide an elongated uniaxial monocrystalline semiconductor element.

It is another object of this invention to provide an elongated uniaxial circular monocrystalline semiconductor element.

It is another object of this invention to provide a uniaxial circular monocrystalline semiconductor memory element.

It is another object of this invention to provide a uniaxial circular crystalline element having segments of different epitaxially compatible materials.

It is another object of this invention to provide a uniaxial circular crystalline element having a core of one material and a covering of another different epitaxially compatible material.

It is another object of this invention to provide a process for fabricating a uniaxial monocrystalline toroidal element.

The foregoing and other objects, features and advantages of the invention will be apparent from the following more particular description of a preferred embodiment of the invention, as illustrated in the accompanying drawings.

In accordance with the invention, the uniaxial crystal signal device is fabricated by impairing a signal enhancement feature, related to the physical property to be utilized, to an elongated uniaxial monocrystalline filament and providing signal introduction and signal sensing means associated therewith.

The monocrystal flexible filaments or whiskers themselves, may be provided by one of the various ways previously described and discussed in greater detail in the above-referenced articles. A detailed description of the preferred method of vapor growth will be provided later.

Figure 1:
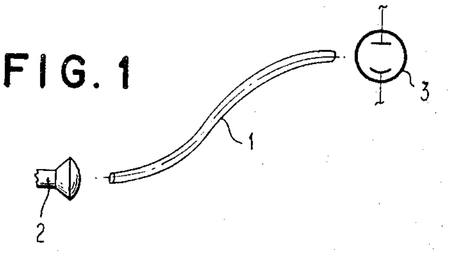
FIG. 1 is a schematic illustration of the uniaxial crystal element of the invention, pointing out the curved crystalline axis parallel to the surfaces thereof, the signal generation and the signal sensing means, and the coupling between signal generation and signal sensing structural feature of the element.

Referring now to FIG. 1, the uniaxial crystal signal device of the invention is schematically illustrated. In FIG. 1, an elongated filamentary monocrystalline element 1 is provided with a signal enhancing feature related to the physical property to be employed and is provided with a signal introducing means 2 and a signal sensing means 3. The filamentary monocrystalline element has a crystalline axis, shown dotted, essentially parallel to the surface thereof. In the particular illustration of FIG. 1, the signal introduction means is illustrated as being a light source 2 and the signal sensing means 3 is shown as being a light sensing source 3 so that the signal enhancement structural feature of the uniaxial crystal filament 1 will involve its optical properties.

Figure 2A:
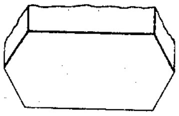
FIG. 2A is a schematic view of the general shape of a ribbon type whisker available in the art.
Figure 2B:
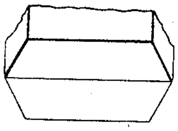
FIG. 2B is a view of the ribbon type whisker of FIG. 2A showing a coherent twin type crytal boundary therein.
Figure 3:
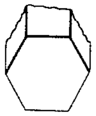
FIG. 3 is a schematic of the hexagonal properties of the symmetrically shaped whisker element available in the art.

The monocrystalline flexible elements or whiskers have been found to have many shapes in the art. A first shape is that of a ribbon, as illustrated in FIG. 2A, some of which frequently are made up of a crystal with a coherent twin boundary at the major axis of the cross-section, as shown in FIG. 2B. A second shape is that of a hexagon, as illustrated in FIG. 3. The whiskers themselves in the unmagnified state are quite difficult to distinguish, but upon sufficiently high magnification, facets are present longitudinally which are generally parallel with a particular crystallographic plane. These ribbons and whiskers have been found to exhibit much higher elastic and tensile strength properties than the same properties in bulk material. The ribbons and whiskers begin to lose their super-elastic properties when their dimensions exceed about twenty-five microns. The ribbons of FIGS. 2A and 2B are often approximately twenty-five microns in width and approximately ten microns in thickness; whereas, the whiskers shown in FIG. 3 are often observed to have diameters not much greater than about ten microns in diameter or between opposing parallel faces. However, both types sometimes have been as small as ordinary optical microscopes can resolve. The monocrystalline crystal whisker or ribbon filaments exhibit extremely high strength properties and great flexibility and can be formed into a toroid shape, without plastic deformation, with a diameter of about 0.050 inch. The filaments have low mass, low internal friction, and high quality optical refraction properties.

In accordance with the invention, one signal enhancement feature that may be imparted to the monocrystalline filament is to form the filament into a uniaxial crystal by providing a single monocrystal filament or whisker and joining the ends into a loop by epitaxially extending crystalline material across the joint so that a single crystalline structure having a curved uniaxial orientation is provided. The uniaxial orientation may be maintained across the joined ends by placing them in abutting relationship or the orientation may be partially misaligned by superimposing the ends before joining.

The forming of the ends into monocrystalline material may be accomplished by immersing the ends of a filament of a monocrystalline whisker in a supercooled melt and withdrawing; or, in a preferred alternative, by the technique known in the art as "vapor growth," wherein a vapor of a transport element and the whisker material is decomposed in the vicinity of the ends of the whisker, which serve as a monocrystalline substrate; and the whisker material, released in the decomposition, epitaxially grows on the substrate whisker ends joining them and forming thereby a body, wherein the periodicity of atomic spacing and crystalline orientation of the original whisker is maintained across the joint.

Figure 4A:
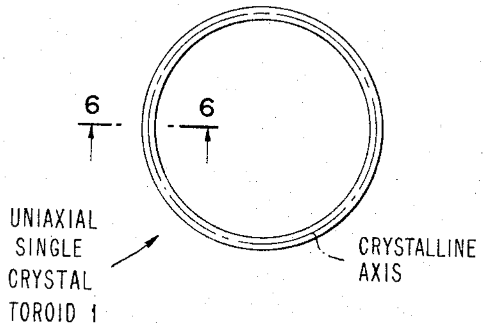
FIG. 4A is a schematic illustration of the toroidal structural feature of the element.
Figure 4B:
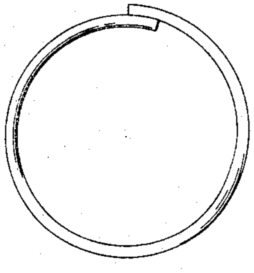
FIG. 4B is an illustration of the uniaxial crystal with the toroid structural feature where the ends are adjacent or lapping, but not abutting.
Figure 4C:
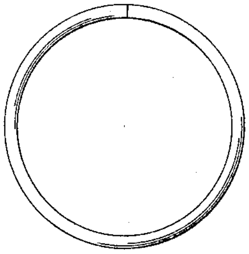
FIG. 4C is an illustration of the uniaxial toroid with the ends forming a crystal twin.

The monocrystalline filament, when provided with the toroidal feature, in accordance with the invention, has a curved crystallographic axis and has its ends joined, as shown in FIG. 4A. The various specific types of joining relationships of the ends and toroidal structures are shown in FIGS. 4A to 4E. In order to impart certain optical advantages, it may be desirable to join the ends of the toroidal shaped monocrystalline filament in super-imposed relationship, as shown in FIG. 4B, so that light introduced at one end may be transmitted out the second. When there is a slight misalignment of the crystalline axis when the ends are in abutting position, a crystal twin boundary will be present as illustrated in FIG. 4C.

Figure 4D:
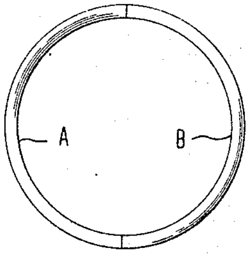
FIG. 4D is an illustration of the uniaxial crystal toroid with the ends joined in abutting relationship and where individual segments are of different materials.
Figure 4E:
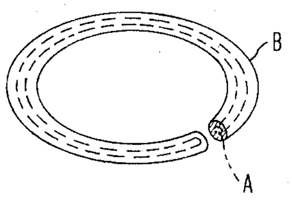
FIG. 4E is an illustration of the uniaxial crystal toroid illustrating an interior portion of one material and a surface portion of a second epitaxially compatible material.

The toroidal structural feature of the uniaxial crystal element of the invention can be made up of a plurality of epitaxially compatible materials, each having certain physical properties useful in the ultimate application of the toroid. The toroid may be made of segments of different materials, as shown in FIG. 4D, where a section A is made of one material; for example, germanium, and a section B is made of a second epitaxially compatible material; for example, gallium arsenide. Similarly, as shown in FIG. 4E, the two materials, such as germanium and gallium arsenide, may be in a core A and coating B relationship. In the germanium-gallium arsenide example above, where appropriate conductivity type determining impurities in appropriate concentrations, the heterojunctions, well known in the semiconductor art, may be formed. The filament structures of FIGS. 4D and 4E may also be used with straight filaments.

Figure 5A:
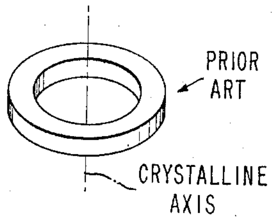
FIGS. 5A and 5B are illustrations of the type of toroidal crystalline structures heretofore available in the art.
Figure 5B:
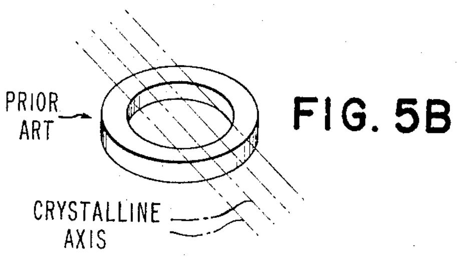

The monocrystalline uniaxial crystal toroid structure may be contrasted with the existing toroid structures in the art, as illustrated by the prior art schematic elements in FIGS. 5A and 5B, wherein circular or toroidal structures are cut from larger monocrystalline bodies of material having a straight crystalline axis either perpendicular, as in FIG. 5A, or parallel, as in FIG. 5B, to the major surfaces, as shown. It will be apparent in comparing the structures of FIGS. 5A and 5B with that of FIG. 1 and FIG. 4A, that since the presently available structures are all cut from a larger body having its own particular orientation that the curved crystalline axis parallel to the surfaces of the crystals, such as applicant provides with the invention, has not been available heretofore in the art.

Crystalline toroid devices of the type of FIGS. 5A and 5B have been employed in the art in semiconductor electrical applications, as shown in U.S. Patents 2,800,617 and 2,822,523, wherein appropriate electrodes have been made around the circle of the toroid. In these devices, minority carriers have been injected at appropriate electrodes and their presence within the toroid has been influenced by rotating electrical fields. Such multi-electrode devices have been found to be useful in circuits for angle modulated waves, such as frequency or phase modulated waves. In devices of this type, the rotating electric field influences the carriers that have been injected and which traverse transit paths of different lengths exhibiting outputs at different times. Such devices can be substantially improved through having a particular crystalline axis parallel to the direction of carrier propagation, such as is provided in accordance with the invention, since the mean free path of minority carriers is greatest parallel to some particular crystalline axis.

Figure 6:
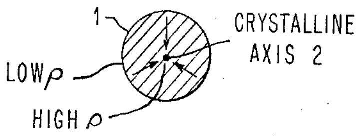
FIG. 6 is a cross-sectional view of the uniaxial crystal device of FIG. 4A illustrating an example of a signal enhancing structural feature in the form of a difference in impurity density in the element.

A particular advantage, in the structural feature in the invention with respect to the semiconductor electrical and mechanical properties thereof, lies in the ability to be able to introduce varied concentrations of impurities into the toroid surface after it has been manufactured. It has been established that the presence of impurities has an effect on the mechanical deformation properties of the element. Where the properties of the element are of the semiconductor electrical type, a semiconductor property, known as "surface recombination," which accounts for substantial losses in a semiconductor device, may be controlled through the introduction of a graded impurity density by diffusion, which progresses from a high impurity concentration at the surface to progressively lower concentrations within the semiconductor structure and sets up thereby an electric field which urges the carriers to the center of the structure and away from the surface. Such a situation is illustrated in FIG. 6 which is a cross-sectional view of the uniaxial crystalline element perpendicular to its curvable crystalline axis with the electric field produced by a graded impurity density shown as vectors from the high impurity concentration region, shown as low resistivity, symbolized low $\rho$ in FIG. 6, to the lower impurity concentration region, shown as high $\rho$ at the center of FIG. 6.

It will be apparent to one skilled in the art that the entire semiconductor technology may be applied in accordance with the invention. For example, various regions of "n" and "p" conductivity material, as well as heterocrystals of more than one semiconductor material as shown in FIGS. 4D and 4E, can be fabricated, in accordance with the standard practice in the semiconductor art, into a uniaxial crystal toroid device and into a filamentary uniaxial crystal element.

Further, the crystalline whiskers are a class of optical fibers and as such, the principles of the art of fiber optics are applicable thereto. However, since the optical properties of a crystal are influenced by the crystallographic axis, in accordance with the invention, it is advantageous to have the desired crystallographic axis parallel to all the surfaces of the whisker.

A schematic example of a uniaxial crystal optical transport device, in accordance with the invention, may be seen in connection with FIG. 1, previously described, wherein a source of optical energy 2 directs its optical energy into the end of the uniaxial crystalline optical filament 1, in accordance with the invention. The uniaxial crystalline element serves as an optical fiber, transmits the optical energy with minimum loss through various changes in direction, as illustrated in FIG. 1 and the optical energy output may be sensed in a suitable responsive device, such as a photocell 3. Many of the semiconductor materials currently available in the art have optical transparency properties in the infra-red region. The monocrystalline filament 1 is provided with a feature which enhances its optical transmission. This feature, for example, may be a particular diameter related to the amplitude and wave length of the signal or as another example, may be bent into a special shape, such as a toroid.

The optical properties of toroidal shaped crystals have been largely unexplored at the current state of development of the art and, in connection with the invention, it is set forth that since the invention exhibits a crystalline axis that is parallel with the surfaces thereof, the optical properties of this crystal will be uniform with respect to crystallographic orientation, regardless of rotational position of the crystal.

As may be seen from the literature discussing the state of the art in the growth of the whiskers, the technique of whisker manufacture has progressed to the point where a wide variety of materials are capable of being fabricated including whiskers involving more than one type of material where the crystal lattice spacings are compatible.

In order to aid one skilled in the art in the practice of the invention, the fabrication of the uniaxial crystal filament element and its formation into a toroid will be discussed in connection with vapor growth of the semiconductor material germanium, although in the light of this teaching, it will be apparent to one skilled in the art that the basic principles set forth for the material germanium are equally applicable to other materials.

Figure 7:
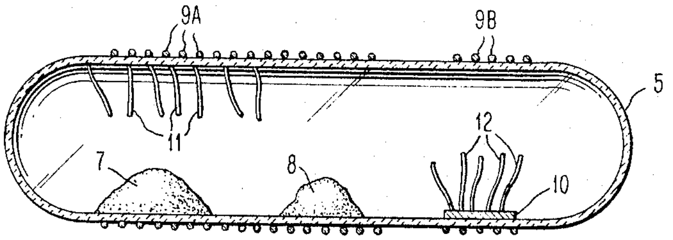
FIG. 7 is a schematic illustration of a vapor growth apparatus used in connection with epitaxially joining the ends of the whisker to form a toroid.

Referring next to FIG. 7, a schematic view of an apparatus is illustrated for providing the monocrystalline filaments in two places therein, by the method of vapor growth. The technique of epitaxial vapor growth has become well-established in the art and has been described in a plurality of articles in the I.B.M. Journal of Research and Development, July 1960. The apparatus of FIG. 7 involves a sealed container 5 of a non-reacting material, such as quartz or vycor; within the container 5 there are a plurality of independent temperature controlled zones, so that a vapor of a compound of a transport element and a material, usually a semiconductor, may be thermally decomposed in the vicinity of a monocrystalline substrate. A source of material 7, to be grown, is positioned at one point in the container 5 and a source of a transport element 8 is positioned at another point. The transport element is generally a halogen, such as iodine. A substrate of monocrystalline material 10 on which growth is to take place, is positioned in a third place within the container 5. Separate temperature controls for each portion of the container are shown schematically as heaters 9A and 9B, which operate to raise and lower the respective regions of the container 5 so as to cause the formation and decomposition of a vaporized compound of the material to be grown and the transport element.

As an illustration, the actual conditions for the semiconductor material germanium are provided.

When the temperature of the source zone under heater 9A is maintained at approximately 550° to 600° C., whiskers 11 grow slowly from the walls of the container 5 in that zone at the rate of approximately 0.100 of an inch per hour. These whiskers grow to a maximum length of approximately one-quarter to one-half inch and are generally of symmetrical cross-section, as shown in FIG. 3.

In the substrate section of the container 5 under the heater 9B, where the temperature is ~350° to 400° C., whiskers tend to grow where a highly supersaturated vapor is present. These whiskers tend to grow faster and are presumably dendrites. The whiskers are mostly of the ribbon type illustrated in FIGS. 2A and 2B and those that have been found thus far up to two inches in length, though a typical length is approximately one-quarter inch.

The whiskers can nucleate from any place in the container, not specifically requiring a substrate; although at times, especially when heavy doping is used, whiskers have preferred the substrate 10 as a growth site.

The whiskers 11 are then employed as previously discussed, in the uniaxial single crystal device of the invention by associating therewith a source of signal introduction and a means for sensing signals transmitted therethrough; and, the whisker has imparted to it a particular structural feature capable of enhancing the signal in the medium employed. For example, the germanium whisker 11 of FIG. 7 may be grown to a diameter such that the amplitude of a source of optical energy, as element 2 in FIG. 1, will be contained therein; and therefore, light transmitted therethrough to an element, such as element 3 of FIG. 1, will be at a minimum loss. On the other hand, if the diameters are comparable with the wave length of the light used, much of the energy of the wave resides outside the whiskers, and coupling to adjacent whiskers is possible.

Where it is desired to form the filamentary element of the device of the invention into a toroid, the ends of the filamentary member are brought into contact and grown together by epitaxial vapor growth as follows.

Figure 8:
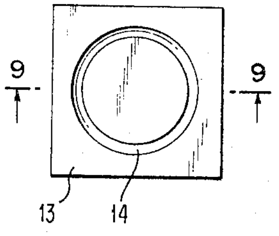
FIG. 8 is a plan view of a joining fixture used to join the ends of the whisker to form a toroid.

Referring next to FIG. 8, a fixture 13 is provided for positioning a whisker in order to grow the ends together. The fixture 13 has an annular groove 14 therein into which the whisker is positioned.

Figure 9:
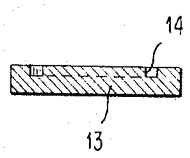
FIG. 9 is an elevation view of the joining fixture of FIG. 8.

Referring next to FIG. 9, a cross-sectional view of the fixture of FIG. 8 is shown illustrating the groove 14.

Figure 10:
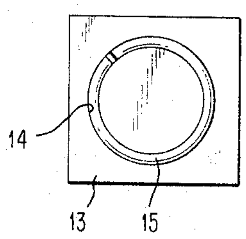
FIG. 10 is a plan view of the joining fixture of FIG. 8 showing the whisker assembled therein for joining.

FIG. 10 illustrates the fixture 13 with the whisker 15 positioned in the groove 14 wherein the ends are shown in abutting relationship. Where an end relationship of the type shown in FIG. 4 is desired, clearance in groove 14 is provided.

Figure 11:
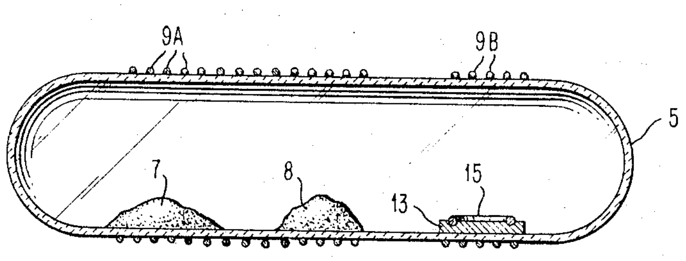
FIG. 11 is another illustration of a vapor growth apparatus showing the joining step in fabricatiog the toroidal structure.

Referring next to FIG. 11, the assembled fixture 13, as illustrated in FIG. 10, containing the whisker 15 is positioned within a container, such as 5 of FIG. 7, in the substrate region thereof. Under conditions, as is described in connection with FIG. 7, but with 9A at 500° to 550° C., the container 5, a vaporized compound of the source element 7 and the transport element 8, is decomposed by making the substrate region under heater 9B at a temperature of approximately 400° C., whereby the abutting ends of the whisker are vapor grown together into a single monocrystalline toroidal structure with a curved crystalline axis paralleling the surfaces thereof. In this case, the vapor in region 9B is not highly supersaturated but only normally supersaturated, in order that no further whiskers will grow.

An alternate method of manufacture, not illustrated, to join the ends, is accomplished by immersing the portion of the fixture 13, where the whisker ends are adjacent, into a supercooled melt of semiconductor material so that the semiconductor material would freeze out and join the ends of the whisker 15. When this is withdrawn from the melt, it would be necessary to remove a quantity that would adhere to the joined ends of the whisker. This could best be done by either etching or cutting.

The ends of the filament or whisker must be positioned in opposing relationship with sufficient care so that the same crystallographic direction is maintained as nearly as possible. The closeness of the care in the positioning of the ends within the fixture 13 would determine whether a single crystallographic twin is formed in the joining operation.

It will also be apparent to one skilled in the art that more sophisticated uniaxial structures, such as a uniaxial moebius strip type of device, may be provided by putting a twist in the whisker before joining the ends. The positioned ends are then grown together in an apparatus, such as FIG. 11.

Figure 12:
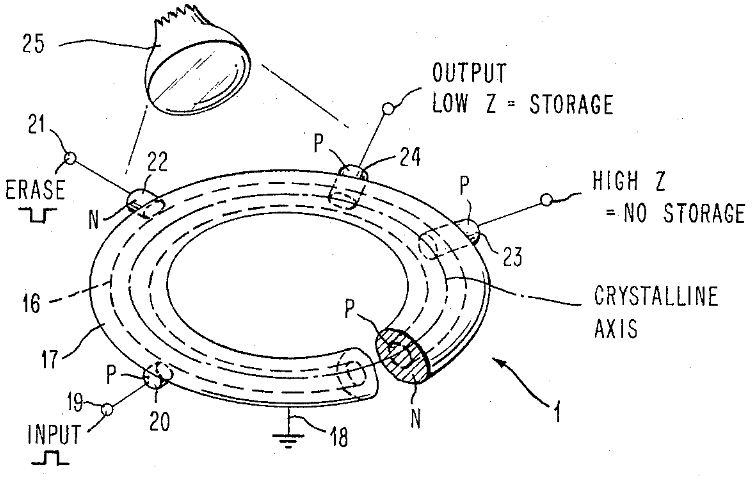
FIG. 12 is a semiconductor memory device illustrating an electrical application of the uniaxial crystal element of the invention wherein the toroidal signal enhancement structural feature is imparted.

Referring next to FIG. 12, a semiconductor storage device employing the uniaxial crystal device of the invention with structural features in the form of a toroidal shape, a selected crystallographic axis and a difference in semiconductor conductivity type is shown. In FIG. 12, the monocrystalline uniaxial filamentary member 1 is provided with a feature in the form of a toroidal shape for signal introduction and electrode positioning and a selected crystalline axis that permits it to transmit signals employing the physical property of its minority carrier lifetime more effectively. The appropriate crystalline axis 2 is employed in which carriers have higher mobility. This feature is coupled with a gradient of impurity density, as illustrated in FIG. 6, from the surface toward the center to reduce surface recombination of the minority carriers. Signal input means for introducing minority carriers in the device and signal sensing means in the form of output contacts are illustrated by appropriate semiconductor conductivity type regions.

Referring in detail to FIG. 12, the semiconductor storage device employs the uniaxial crystal filamentary member in toroidal shape with the single curved crystalline axis 2 parallel to the surfaces thereof and having a graded resistivity that is low at the surface and higher at the center. The crystalline axis chosen by selection of an appropriate substrate in growth, as described in connection with FIG. 7, is one in which electric carriers have a high mobility.

The crystal toroid 1 of monocrystalline germanium semiconductor material has a "p" conductivity type center 16 and includes a graded resistivity "n" conductivity type skin 17 having a low resistivity on the surface and a higher resistivity within, where it joins the "p" conductivity type region. The surface of the element 1 is shown grounded with a connection 18. An input connection 19 is provided by the standard technique in the semiconductor industry of alloying a "p" conductivity type region 20 into the "n" conductivity type region so that a positive pulse will inject minority carriers into the "n" conductivity type region 17.

An erase electrode 21 is provided having an "n" conductivity type alloyed connection 22, which, in the presence of a negative pulse, will operate to reverse bias the junction between the "n" region and central "p" region and thereby to erase information present. First and second output connections 23 and 24 are provided around the circle of the toroid, although it will be apparent to one skilled in the art that as many output connections as space and practical considerations provide can be utilized. The output connection is fabricated by alloying a "p" region into the central "p" region of the toroid. When information is present in the toroid, a low impedance will be seen at the output connection and when no information is present, high impedance will be seen. An alternate source of input information is shown schematically as a light 25 which operates to inject minority carriers into the center portion of the toroid. As a result of the graded resistivity skin reducing the surface recombination, coupled with the advantages of uniaxial crystal, the migration distance during the lifetime of carriers so injected is greatly enhanced and results in a superior performing device.

In order to aid one skilled in the art in practicing the invention, the following set of specifications for the vapor growth apparatus of FIGS. 7 and 11 for the operations of fabrication of whisker filaments 11 or 12 and the joining of the ends of the whisker filament into the uniaxial crystal toroid 1 are provided below, it being understood that many sets of such specifications in the light of the above teaching could be provided by one skilled in the art and the particular ones set forth below are merely to enable one skilled in the art to have a starting place in a complicated technology.

In a semiconductor device application, it will be apparent that the control on the purity of both the uniaxial crystalline element and of the resulting deliberately added conductivity type determining impurities must necessarily be such as to be compatible with semiconductor technology. In other words, since one impurity atom in one billion crystalline atoms is enough to influence conductivity, steps necessary to maintain such purity are essential.

*Table*

| | |
|---|---|
| Reaction tube **5** | Quartz, 20 centimeters long; 2 centimeters in diameter. |
| Semiconductor material **7** | Germanium, "n" type, 10 grams; 5 ohm centimeters, resistivity. |
| Transport element **8** | Iodine, 100 mg. |
| Substrate material **10** | Germanium, monocrystalline. |
| Temperatures in growth operation: | |
| In the substrate region (under heater **9B**) | 350°–400° C. (for FIG. 7); ~400° C. (for FIG 11). |
| In the source semiconductor material **7** (under heater **9A**) | 550°–600° C. (for FIG. 7); 500°–550° C. (for FIG. 11). |

The halogen vaporizes and reacts as the tube is being heated.

Under such conditions, filament whiskers approximately one-quarter of an inch long are grown in four hours.

With respect to the joining of the ends, the above conditions apply, except that the 9B region is at ~400° C. so that the degree of supersaturation is not as high as it was in the first case, and the ends are joined in approximately one hour. Once the ends are joined, it will be apparent to one skilled in the art that the cross-sectional area with the technique of vapor growth of filament can be increased to a value greater than that at which a similar device could be bent. In other words, after bending the toroid may be thickened by vapor growth beyond its usual cross-sectional area for highly elastic behavior and coatings as shown in FIG. 4E may be added.

What has been described is a uniaxial crystal signal device wherein a combination of a monocrystalline uniaxial filamentary element is provided with a signal enhancing structural feature related to the physical property employed in the signal transmission and is combined with signal introducing and signal sensing means. The device of the invention has been illustrated in connection with the use of the electrical, mechanical and optical properties thereof and provides a unique flexible device very valuable in the art.

While the invention has been particularly shown and described with reference to a preferred embodiment thereof, it will be understood by those skilled in the art that the foregoing and other changes in form and details may be made therein without departing from the spirit and scope of the invention.

What is claimed is:

1. A semiconductor device comprising:

(a) a toroidal semiconductor element comprising a semiconductor crystal whisker shaped in toroidal form and epitaxially joined at its ends;

(b) said whisker having a single crystalline axis following the curvature of said toroid;

(c) said element including a central core portion of a first conductivity type and an outer skin portion of a second conductivity type joined together at a first semiconductor junction surrounding said central core portion;

(d) an input for said device comprising a second semiconductor junction formed in said outer skin portion of said device;

(e) and an output means for said device extending through said outer skin portion to said central core portion of said element.

2. A semiconductor device comprising:

(a) a toroidal semiconductor element comprising: a semiconductor crystal whisker shaped in a toroidal form and epitaxially joined at its ends;

(b) said whisker having a single crystalline axis following the curvature of said toroid;

(c) said element including a central core portion of a first conductivity type and an outer skin portion of a second conductivity type formed together at a first semiconductor junction surrounding said central core portion;

(d) said outer skin portion having a graded resistivity with the resistivity at the outer surface thereof lower than in the central portion adjacent said first junction;

(e) an input for said device comprising a second semiconductor junction formed in a first region of said outer skin portion of said element;

(f) and output means for said device comprising first and second individual connections extending through said outer skin portion to said central portion of said element;

(g) said first and second connections extending through second third regions of said skin portion separated from each other and from said first region.

3. A semiconductor device comprising:

(a) a toroidal semiconductor element comprising a semiconductor crystal whisker shaped in toroidal form and epitaxially joined at its ends;

(b) said whisker having a single crystalline axis following the curvature of said torroid;

(c) input means for applying input signal energy corriers to a first portion of said element;

(d) said element comprising means for confining said energy carriers along said curved crystalline axis of said whisker toroid whereby said energy carriers propagate from said first portion to a second portion separated from said first portion;

(e) and output means coupled to said second portion of said element.

4. The semiconductor device of claim 3 wherein said input means comprises means for applying radiant energy inputs to said element.

5. The semiconductor device of claim 3 wherein said input means comprises a p-n junction formed in said whisker.

6. The semiconductor device of claim 3 wherein said element includes a central portion and an outer skin portion having a graded resistivity for confining said signal energy to said central portion.

References Cited by the Examiner

UNITED STATES PATENTS

| | | | |
|---|---|---|---|
| 2,383,993 | 9/1945 | Skinker | 317—236 |
| 2,655,607 | 10/1953 | Reeves | 307—88.5 |
| 2,763,581 | 9/1956 | Freedman | 317—235 |
| 2,813,811 | 11/1957 | Sears | 148—1.6 |
| 2,975,344 | 3/1961 | Wegener | 317—235 |
| 2,976,447 | 3/1961 | McNaney | 313—108 |
| 3,014,149 | 12/1961 | Wasserman | 313—108 |
| 3,072,507 | 1/1963 | Anderson et al. | 317—235 |
| 3,091,561 | 5/1963 | Marzocchi et al. | 88—1 |
| 3,112,997 | 12/1963 | Benzing et al. | 317—235 |
| 3,121,062 | 2/1964 | Gauld | 148—1.6 |
| 3,122,655 | 2/1964 | Murray | 307—88.5 |

OTHER REFERENCES

Journal of Applied Physics: vol. 27, No. 12, December 1956, pp. 1484–1491, an article by S.S. Brenner: Tensile Strength of Whiskers.

JOHN W. HUCKERT, *Primary Examiner.*

ARTHUR GAUSS, J. D. KALLAM, C. E. PUGH, *Assistant Examiners.*